Nov. 23, 1954

T. H. GRONLUND ET AL 2,694,895

SIDE DELIVERY CONVEYER RAKE

Filed Feb. 6, 1953

Theodore H. Gronlund
William W. Wright
INVENTORS

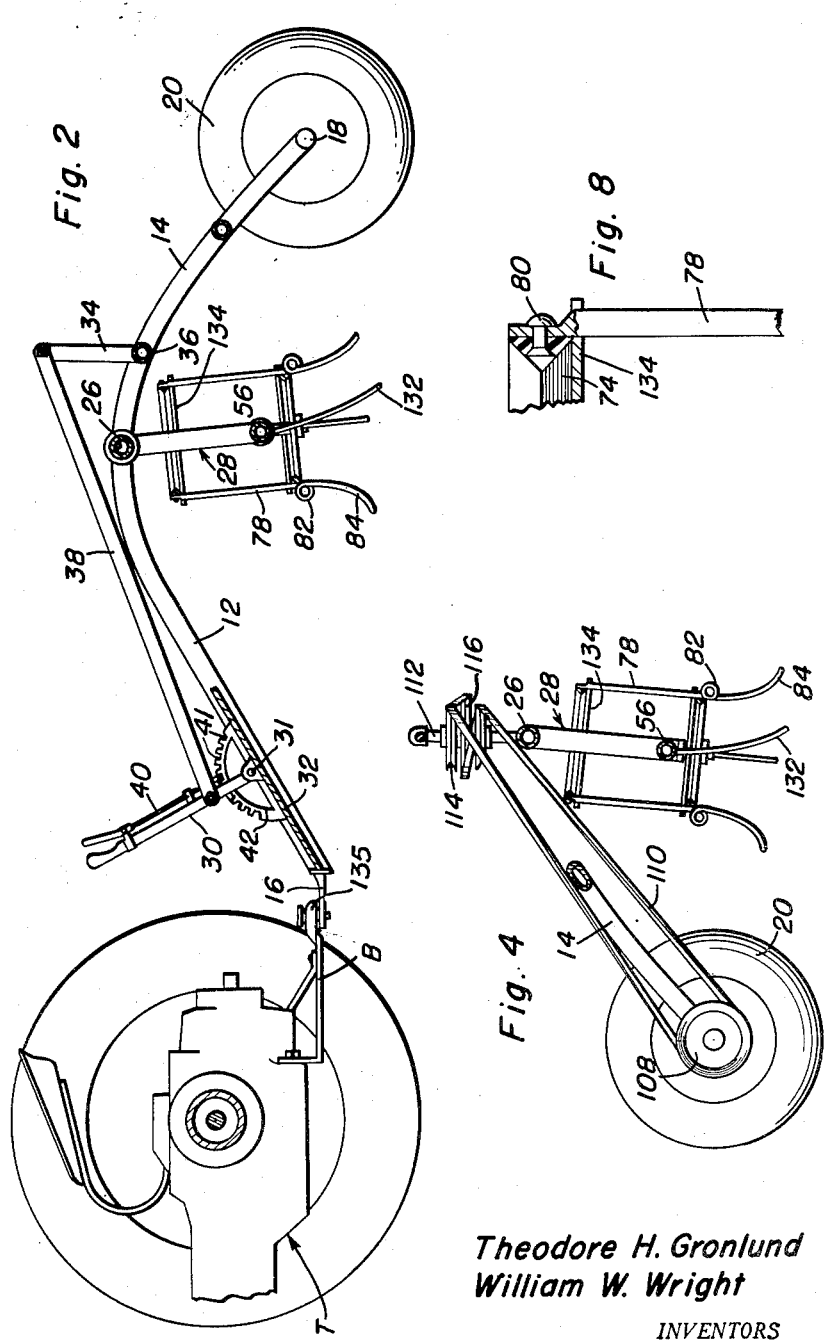

Nov. 23, 1954
T. H. GRONLUND ET AL
2,694,895
SIDE DELIVERY CONVEYER RAKE
Filed Feb. 6, 1953
3 Sheets-Sheet 3
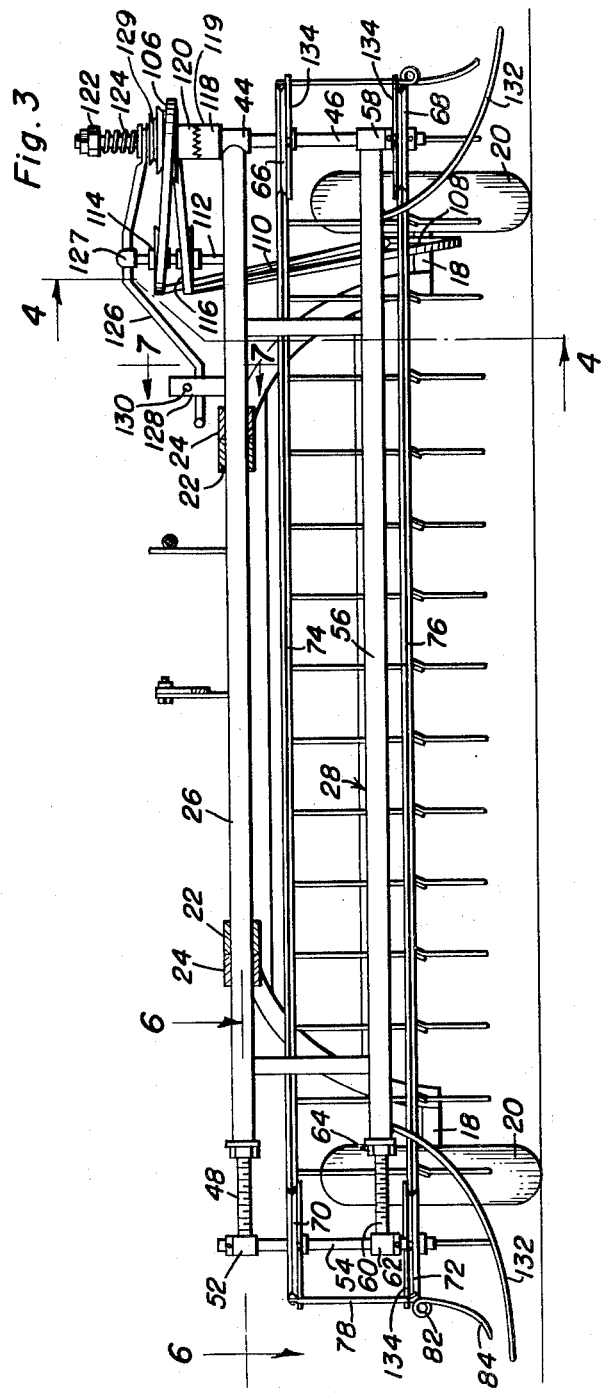
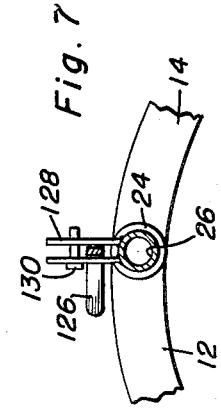
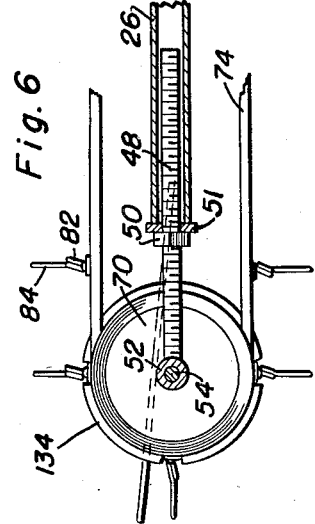
Theodore H. Gronlund
William W. Wright
INVENTORS

United States Patent Office 2,694,895
Patented Nov. 23, 1954

2,694,895

SIDE DELIVERY CONVEYER RAKE

Theodore H. Gronlund and William W. Wright, Jackson, Minn.

Application February 6, 1953, Serial No. 335,512

6 Claims. (Cl. 56—376)

This invention relates to new and useful improvements in tractor raking attachments and the primary object of the present invention is to provide a wheeled frame composed of forward and rear hingedly connected sections that support an endless conveyor rake member that may be selectively raised and lowered with respect to the ground or material being raked.

Another important object of the present invention is to provide a conveyor rake including a swingable hinge member supporting an endless conveyor and rake member embodying novel and improved means for retaining the hinge member in a selected swung position so that the teeth may engage the material to be raked at a predetermined angle.

A further object of the present invention is to provide a conveyor rake wherein the conveyor supporting member is provided with a portion constituting a hinge means joining the forward and rear sections of the frame.

A still further aim of the present invention is to provide a conveyor rake of the aforementioned character that is extremely simple and practical in construction, strong and reliable in use, efficient and durable in operation, inexpensive to manufacture, and otherwise well adapted for the purposes for which the same is intended.

These and other ancillary objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged longitudinal vertical sectional view taken substantially on the plane of section line 2—2 of Figure 1;

Figure 3 is an enlarged transversed vertical sectional view taken substantially on the plane of section line 3—3 of Figure 1;

Figure 4 is a vertical sectional view taken substantially on the plane of broken section line 4—4 of Figure 3;

Figure 6 is an enlarged sectional view taken substantially on the plane of section line 6—6 of Figure 3;

Figure 7 is an enlarged detail vertical sectional view taken substantially on the plane of section line 7—7 of Figure 3; and Figure 8 is an enlarged detail fragmentary view of Figure 2 to illustrate the manner in which the rake teeth are secured to their supporting belts.

Figure 1:
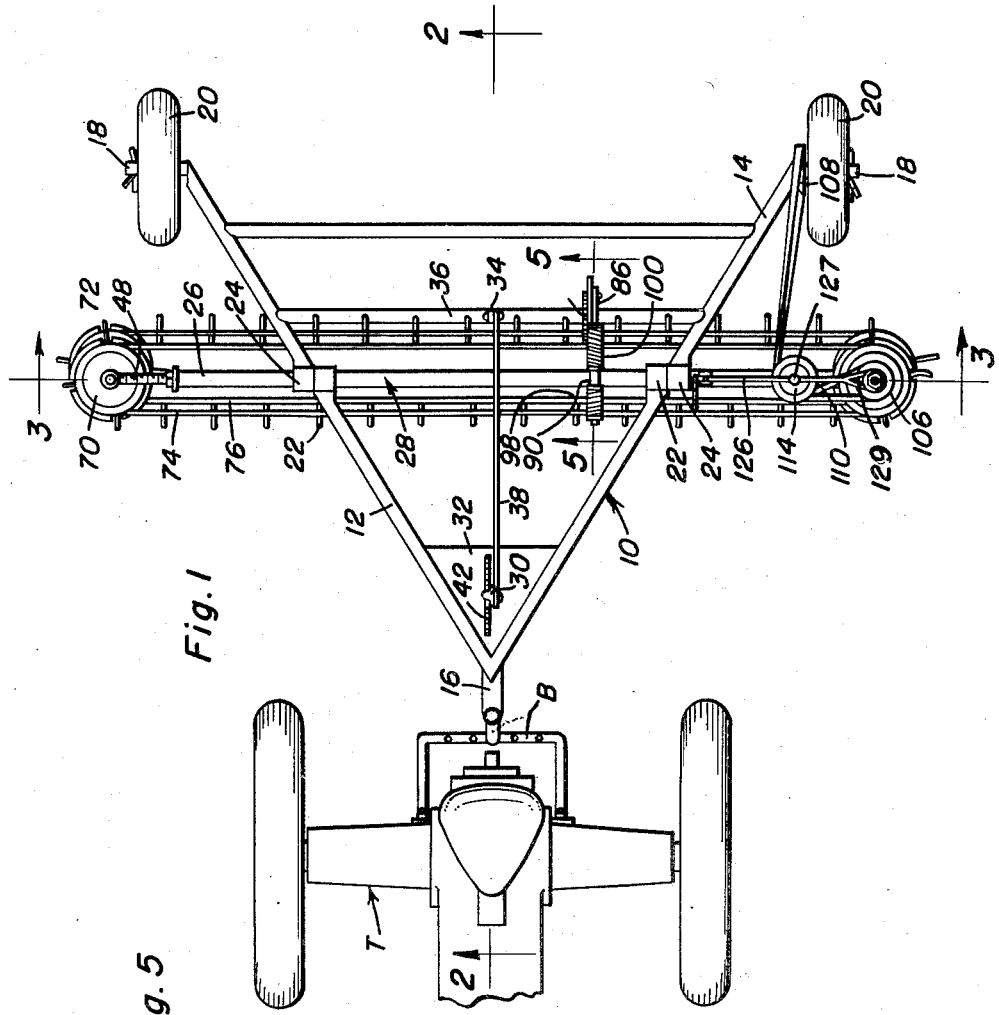
Figure 1 is a fragmentary top plan view of a tractor and showing the present invention operatively attached thereto.

Referring now to the drawings in detail, wherein for the purpose of illustration, there is disclosed a preferred embodiment of the present invention, the numeral 10 represents a substantially V-shaped wheel frame composed of forward and rear frame sections 12 and 14. Forward section 12 fixedly supports a hitch device 16 that may be quickly and readily attached to or removed from the rotatable draw bar B of a tractor T in a convenient manner. The rear end of section 14 fixedly supports a pair of coaxial, horizontal, stub axles 18 on which rear wheels 20 are mounted.

The rear end of section 12 supports a pair of spaced apart coaxial, horizontal, bearings 22 that register with spaced apart, coaxial bearings 24 fixed to the forward end of section 14. The upper horizontal tubular rail portion 26 of an elongated substantially H-shaped hinge and support member 28 extends through the bearings 22 and 24 to hingedly connect the frame sections 12 and 14 together.

Means is provided for selectively raising and lowering the hinge member 28 and the connected ends of the frame sections 12 and 14. This means comprises adjusting lever 30 pivotally attached, as at 31, to a gusset plate 32 strengthening the forward end of the frame section 12. The lever 30 is connected to an arm 34, fixed to a cross-member 36 of frame section 14, by a pitman 38 so that as the lever 30 is swung rearwardly the member 28 and the joined ends of sections 12 and 14 can be moved upwardly, whereas a forward movement of lever 30 will cause the wheels 20 to be moved rearwardly since the hinge member 28 and the joined ends of sections 12 and 14 will be lowered.

The lever 30 slidably supports a spring urged locking dog 40 that will selectively enter notches 41 in the notched arcuate edge of a ratchet plate 42 fixed to plate 32, in order to retain the joined ends of the sections 12 and 14 adjusted a selected distance above the ground.

Member 28 is swingably engaged with the frame sections 12 and 14 since its upper rail portion 26 is positioned in the bearings 22 and 24. One end of portion 26 fixedly supports a bearing 44 for a shaft 46 and its other end accommodates a screw-threaded rod 48. A nut 50 threaded on the rod 48 engages a washer 51 engaging the portion 26 to limit movement of rod 48 into portion 26. The outer end of rod 48 fixedly supports a bearing 52 for a second shaft 54 which parallels shaft 46.

The lower horizontal tubular rail portion 56 of member 28 fixedly supports a bearing 58 at one end for shaft 46. The other end of portion 56 slidably adjustably receives a screw threaded rod 60 whose outer end fixedly supports a bearing 62 for shaft 54. An abutment nut 64 on rod 60 engages portion 56 to adjust the portion of rod 60 that is disposed in portion 56.

Upper and lower V-pulleys 66 and 68 are fixed on shaft 46 and similar upper and lower V-pulleys 70 and 72 are fixed on shaft 54. An upper endless V-shaped pulley belt 74 extends between and about the upper pulleys 66 and 70, and a lower endless V-shaped pulley belt 76 extends between and about the lower pulleys 68 and 72.

Resilient rake teeth or tines 78 extend between and are fixed to the belts 74 and 76 by rivets or the like 80 (Figure 8). The lower end portions of the teeth 78 are provided with shock reducing coils 82 and terminate in curved extensions 84 for engaging grass or the like being raked.

Means is provided for tilting the member 28 and retaining the member 28 in a selected tilted or swung position, whereby the ends 84 of the teeth 78 will engage cut material on the ground at a selected angle. The tilt means comprises an adjusting lever 86 pivotally attached, as at 87, to cross-member 36 and having the rear end of a forwardly extending rod 88 pivoted thereto by means of a fastener 89. A spool 90 slidably received on the rod 88 has a lug 92, fixed to portion 26, disposed between its end flanges.

Figure 5:
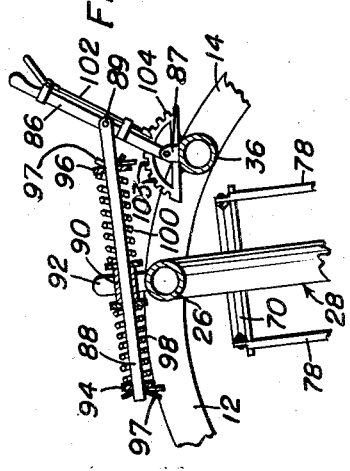
Figure 5 is an enlarged detail vertical sectional view taken substantially on the plane of section line 5—5 of Figure 1.

Abutments 94 and 96 are secured to the end portions of rod 88 by means of cotter pins 97 or the like. Coil springs 98 and 100 on the rod 88 are biased between the spool 90 and abutment 94 and spool 90 and abutment 96, respectively, to yieldingly restrict sliding of spool 90 on rod 88. A spring urged locking dog 102 is slidably carried by lever 86 and will enter a selected notch 103 in the upper notched or toothed edge of a gear segment or ratchet 104 fixed on the cross-member 36, to retain the member 28 in a pre-selected tilted position, as shown in Figure 5.

Means is provided for moving the belts 74 and 76 and the teeth carried thereby. This means comprises a pulley 106 journaled on the upper end of shaft 46 and connected to a pulley 108 fixed to one of the wheels 20 by an endless pulley belt 110. A post 112 fixed to the portion 26 of member 28 has belt turning and guiding pulleys 114 and 116 journaled thereon which engage the spaced flights or belts 110.

A clutch collar 118 is suitably fixed to shaft 46 and has an upper clutch face 119 that opposes the lower clutch face of a clutch collar 120 fixed to pulley 116. An abutment nut 122 threaded on the upper shaft 46 forms an abutment for a coil spring 124 that urges pulley 106 downwardly and the clutch collar 120 into clutching engagement with collar 118. A rock lever 126 is pivoted, as at 127, to the upper end of post 112 and its bifurcated end 129 engages the pulley 126 to permit raising of the pulley 106 and collar 120 relative to the collar 118.

A guide bracket 128 is fixed to portion 26 of member 28 and slidably receives the lever 126. A removable pin 130 carried by bracket 128 limits upward movement of the end of lever 126 that is engaged with the bracket.

A relatively light rod 132 is bolted to tubular rail portion 56 at one end and a similar rod is bolted to rod 60 on the other end. These rods curve downwardly and rearwardly under the rake teeth to prevent the teeth from carrying hay around the back of the raking unit.

Belt pulleys 66 and 68 have peripheral notches and flanges 134 to receive the teeth 78 in order to prevent the belts 74 from slipping while aiding in retaining the teeth in a vertical position.

In practical use of the present invention, it is noted that the hitch device 16 may comprise a ball and socket coupling 135 whereby the section 12 of frame 10 may be selectively raised and lowered. The lever 30 is moved either forwardly or rearwardly in order to raise the joined ends of the sections 12 and 14 and the hinge member 28 above the ground a predetermined distance, then the dog 40 is engaged with the ratchet 42 to retain the member 28 raised to this preselected position.

The tilt of member 28 is accomplished by positioning of dog 102 in a selected notch of ratchet 104 as previously described so that the extensions 84 of teeth 78 will engage material to be raked and conveyed at a desired angle.

As the tractor moves forward, the wheels 20 will rotate and the wheel which is operatively connected to the shaft 46 will cause the belts 74 and 76 to be driven in order that material will be raked and deposited at one side and behind the tractor T.

In the event it is desired to pile the raked material at an opposite side of the tractor then it is merely necessary to twist the belt 110 so that the belts 74 and 76 will be rotated in the direction opposite from that originally described.

Since the member 28 may be tilted to incline the rake teeth, the teeth are capable of conveying light fluffy hay which lies lightly on the ground as well as having hay which has been exposed to rain and which lies tight to the ground.

What is claimed as new is as follows:

1. A conveyor rake comprising a frame including forward and rear sections, hitch means carried by the forward section, supporting wheels carried by the rear section, said rear section having a forward end and said forward section having a forward end and said forward section having a rear end, aligned bearings fixed to the adjacent ends of said sections, a swingable hinge member having a horizontal portion extending through said bearings and hingedly connecting said sections, means adjustably connecting the sections to selectively raise and lower said hinge member and the connected ends of said sections, an endless conveyor rake member supported by said hinge member, and means connecting said hinge member to said frame for retaining the hinge member in a selected swung position.

2. A conveyor rake comprising a frame including forward and rear sections, hitch means carried by the forward section, supporting wheels carried by the rear section, said rear section having a forward end and said forward section having a forward end and said forward section having a rear end, aligned bearings fixed to the adjacent ends of said sections, a swingable hinge member having an upper horizontal portion extending through said bearings and hingedly connecting said sections and a lower portion spaced from the upper portion, means adjustably connecting the sections to selectively raise and lower said hinge member and the connected ends of said sections, a pair of parallel shafts rotatably supported in vertical position by the hinge member, upper and lower pulleys fixed on said shafts, upper and lower endless belts engaging said upper and lower polleys, tines secured to said upper and lower belts, and means connecting said hinge member to said frame for retaining the hinge member in a selected swung position.

3. The combination of claim 2 and a drive connection between one of said wheels and one of said shafts.

4. The combination of claim 3 and a clutch mechanism forming part of said drive connection.

5. A conveyor rake comprising a frame including forward and rear sections, hitch means carried by the forward section, supporting wheels carried by the rear section, said rear section having a forward end and said forward section having a forward end and said forward section having a rear end, aligned bearings fixed to the adjacent ends of said sections, a swingable hinge member having an upper horizontal portion extending through said bearings and hingedly connecting said sections and a lower portion spaced from the upper portion, means adjustably connecting the sections to selectively raise and lower said hinge member and the connected ends of said sections, a pair of parallel shafts rotatably supported in vertical position by the hinge member, upper and lower pulleys fixed on said shafts, upper and lower endless belts engaging said upper and lower pulleys, tines secured to said upper and lower belts, and means connecting said hinge member to said frame for retaining the hinge member in a selected swung position, upper and lower horizontal rods longitudinally adjustably carried by said upper and lower portions of the hinge member, bearings fixed to said rods accommodating one of said shafts.

6. A conveyor rake comprising forward and rear frame-forming sections, said forward section having a rear end and said rear section having a forward end, a pair of spaced coaxial bearings fixed to the rear end of the forward section, a second pair of coaxial bearings fixed to the forward end of the rear section, an elongated swingable hinge member having an upper horizontal portion extending through all of said bearings to hingedly connect said sections, means connecting said sections together for selectively raising and lowering the hinge member and the joined ends of said sections, an endless rake member supported by said hinge member, and tilting means connecting said hinge member to one of said sections to retain the hinge member in a selected swung position.

References Cited in the file of this patent

UNITED STATES PATENTS

| Number | Name | Date |
|---|---|---|
| 935,456 | Blackstone et al. | Sept. 28, 1909 |
| 1,406,506 | Stansberry | Feb. 14, 1922 |
| 2,511,100 | Clark | June 13, 1950 |